United States Patent Office 2,754,015
Patented July 10, 1956

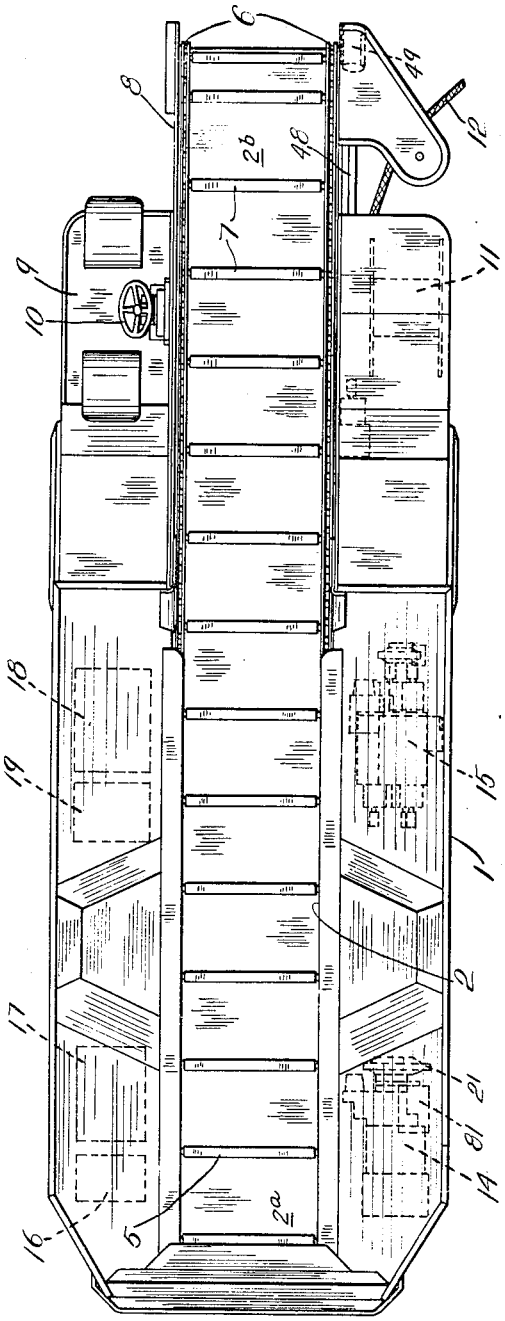

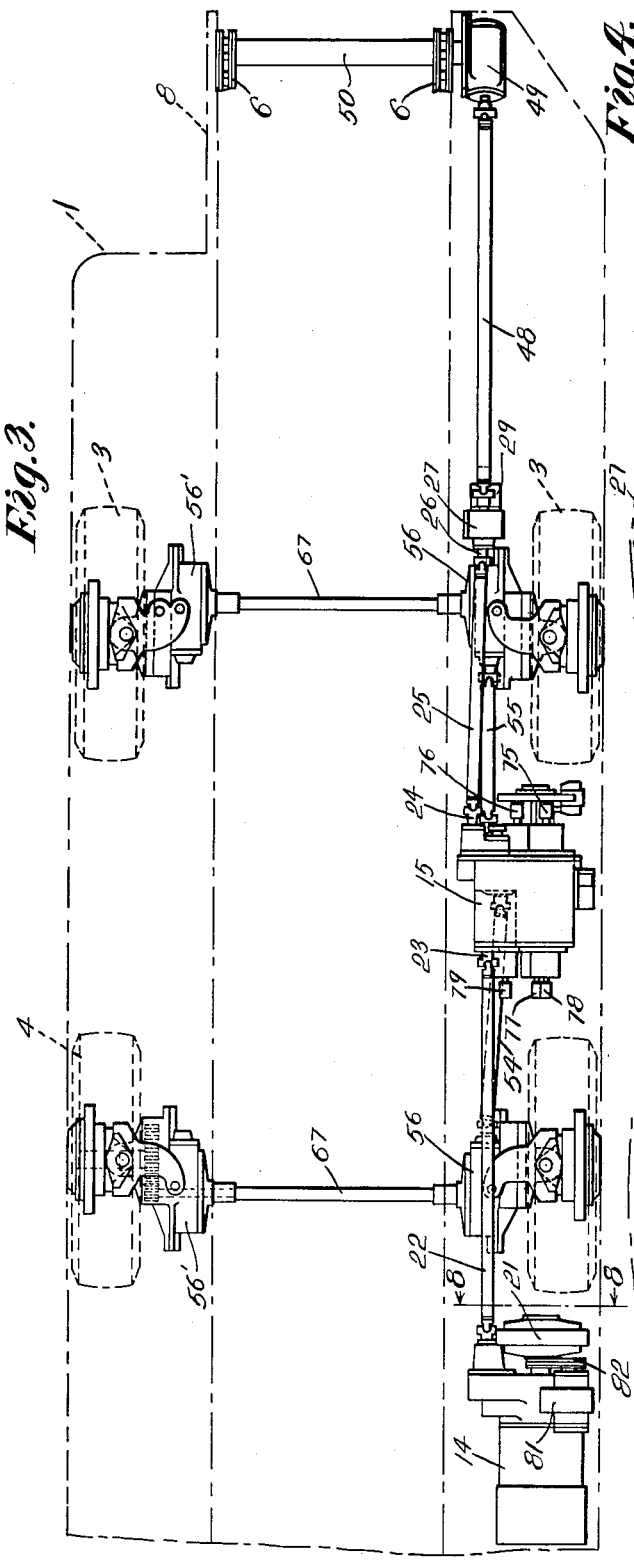

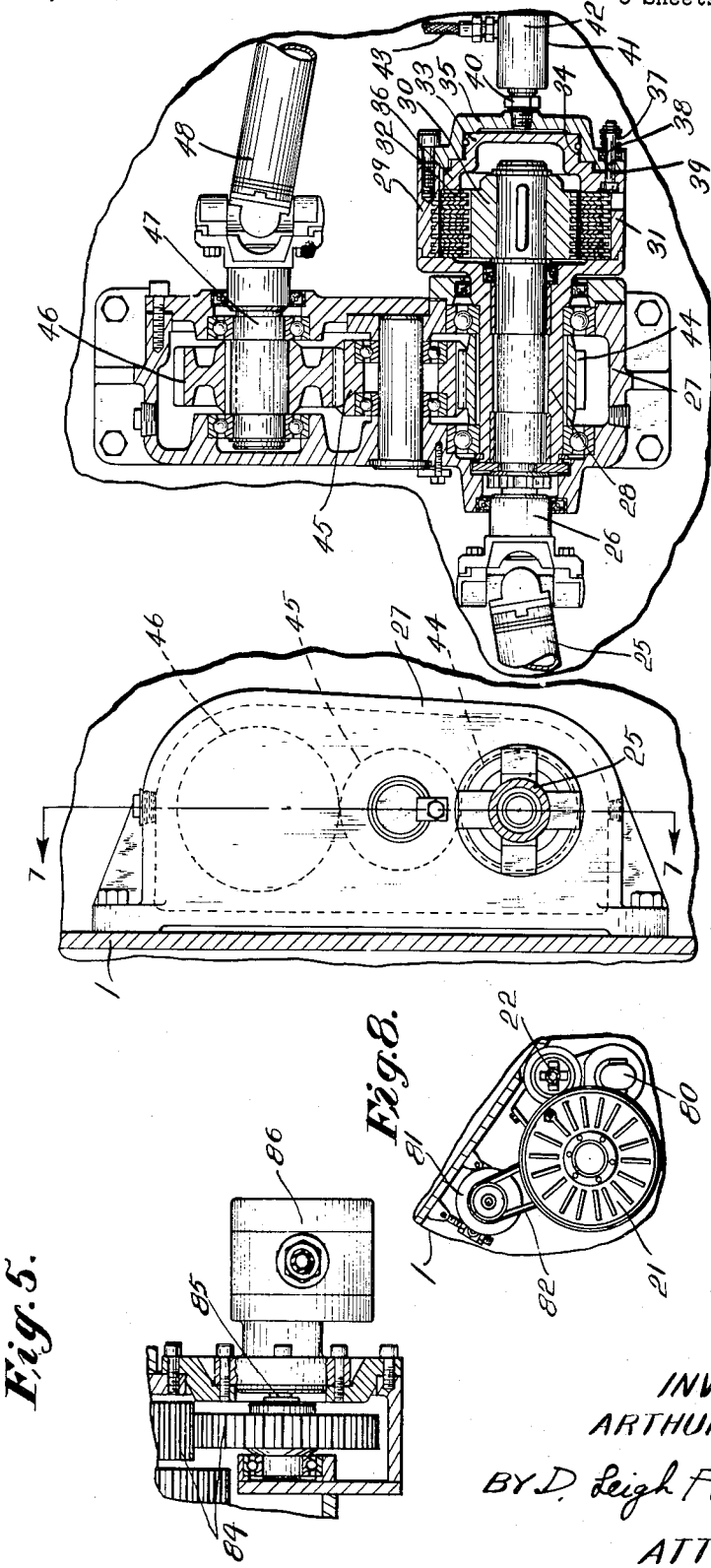

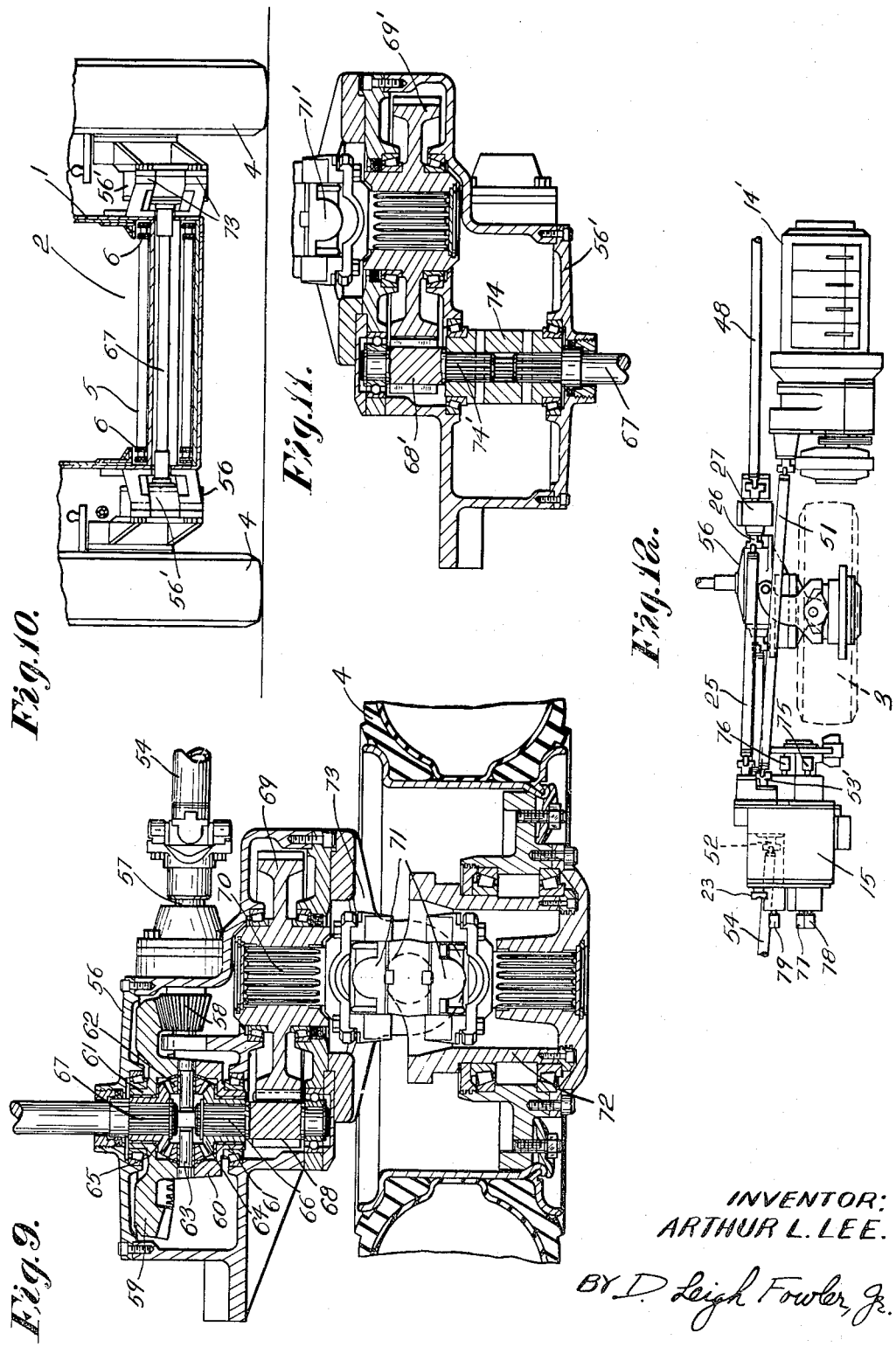

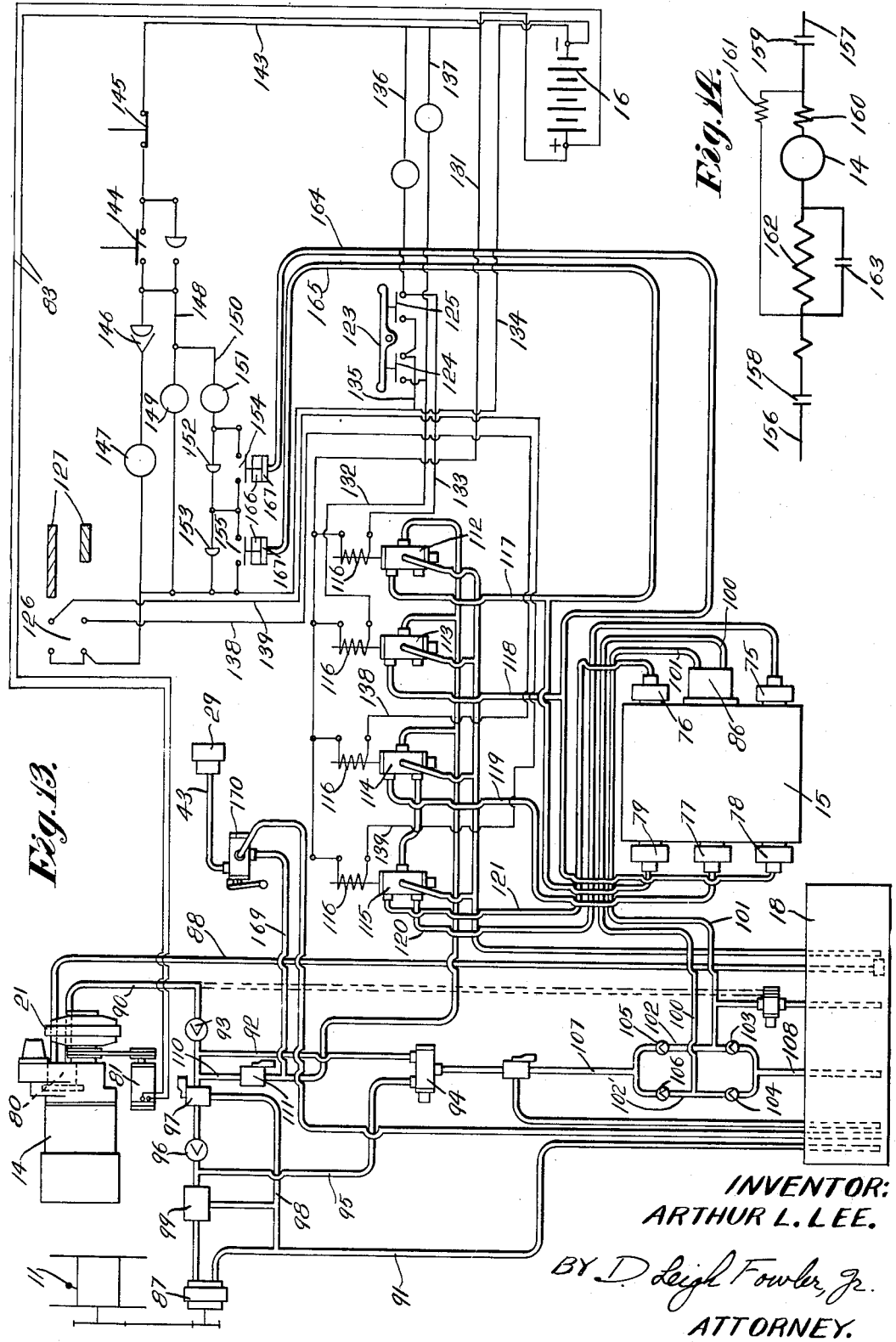

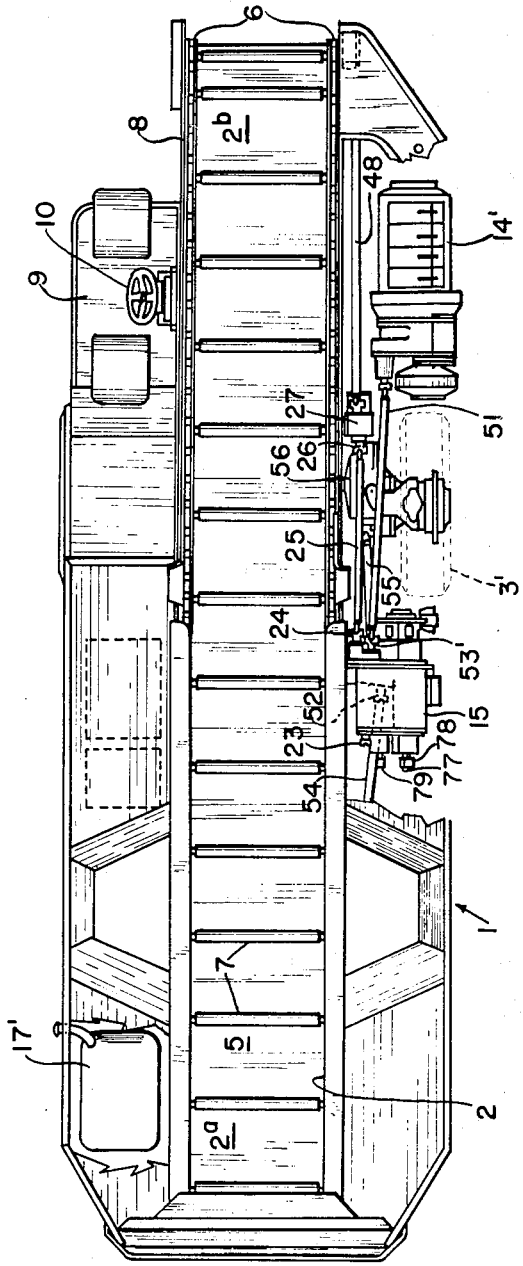

2,754,015

MINE HAULAGE VEHICLE

Arthur L. Lee, Columbus, Ohio, assignor to Pittsburgh Consolidation Coal Company, Pittsburgh, Pa., a corporation of Pennsylvania Application August 31, 1951, Serial No. 244,549

19 Claims. (Cl. 214—83.36)

This invention relates to automotive vehicles and more particularly to a mine haulage vehicle of the type commonly known as a "shuttle car" especially designed for use in hauling loose material in underground mines.

An object of the present invention is to provide an improved automotive vehicle. Another object is to provide an improved mine haulage vehicle of the type commonly known as a "shuttle car" having novel features of construction. A further object is to provide an improved automotive vehicle having propelling and steering means such as traction and steering wheels and improved driving means therefor. A still further object is to provide an improved automotive vehicle which has improved propelling means adapted to be driven by alternative sources of power such as A. C. or D. C. electric motors or an internal combustion engine. Yet another object is to provide an improved mine haulage vehicle having certain of its elements operated by liquid under pressure and having novel means associated therewith for generating liquid under pressure. A further object is to provide an auxiliary pump operating only when the vehicle is traveling and driven by the vehicle wheels whereby a supplemental source of liquid under pressure may be provided while the vehicle is in motion and the liquid pressure demand is greater. A still further object is to provide improved liquid pressure generating means whereby a relatively small volume of liquid may be provided while the vehicle is stationary and a supplemental supply of liquid under pressure is made available while the vehicle is traveling and the liquid pressure demands are relatively high, thereby eliminating the need of by-passing a relatively large volume of liquid, with its inherent power losses, while the vehicle is stationary and when only a relatively small volume of liquid pressure is needed. Another object is to provide an improved hydraulic and electric system for such a vehicle. A further object is to provide an improved electrical control system for an electrically driven "shuttle car." These and other objects and advantages of the invention will, however, hereinafter more fully appear.

In the accompanying drawings there is shown for purposes of illustration one form which the invention may assume in practice.

In these drawings:

Fig. 1 is a plan view and Fig. 2 is a side elevational view of a mine haulage vehicle in which a preferred illustrative form of the invention is embodied.

Fig. 3 is a somewhat schematic view with the vehicle body in outline and showing portions of the driving means for the traction wheels and the conveyor.

Fig. 4 is a schematic side view, similar to Fig. 3, showing the vehicle in side elevation.

Fig. 5 is an enlarged detail section taken through the auxiliary pump driven through the vehicle-transmission.

Fig. 6 is an enlarged detail transverse vertical section taken on line 6—6 of Fig. 4, showing a portion of the conveyor drive.

Fig. 7 is a detail longitudinal vertical section taken on line 7—7 of Fig. 6.

Fig. 8 is a detail transverse vertical section taken on line 8—8 of Fig. 3, showing a portion of the drive.

Fig. 9 is an enlarged developed section taken substantially on the planes of line 9—9 of Fig. 4, showing details of the drive for one of the traction wheels.

Fig. 10 is an enlarged fragmentary cross section taken on line 10—10 of Fig. 2.

Fig. 11 is a detail section taken on the plane of Fig. 9, showing the drive for an opposite traction wheel.

Fig. 12 is a fragmentary view of a portion of the structure shown in Fig. 3, illustrating the connection with an alternate power source.

Fig. 13 is a diagrammatic view illustrating the hydraulic and electric systems.

Fig. 14 is a diagrammatic view illustrating the electrical control system for the electric motor.

Fig. 15 is a plan view similar to Fig. 1 with portions of the body broken away to illustrate a haulage vehicle having an internal combustion engine as an alternative power source.

The several features of the invention, as shown in the drawings, are embodied in a mine haulage vehicle of the kind commonly known as a "shuttle car" especially designed for use in transferring loose material in underground mines, and while such features are especially adapted to use with such a vehicle they are also adapted to use with automotive vehicles of other types.

The mine haulage vehicle disclosed herein generally comprises a body 1 having a material receiving compartment 2 with a material-receiving end portion 2a and a material-discharging end portion 2b. The body 1 is mounted on pairs of front and rear traction and steering wheels 3 and 4, with the compartment 2 extending longitudinally between the wheels in the manner shown in Figs. 1, 10 and 15. Extending along the bottom of the compartment is a conventional endless flight conveyor 5 having endless side chains 6 suitably guided within guideways within the body and to which usual cross flights 7 are connected. The discharge end of the conveyor extends along a tiltable end frame 8 which is tiltable to effect variations in the discharge height of the conveyor. Arranged at one side of the discharge end of the vehicle body is a compartment 9 which provides a station for the operator and which has therein a steering wheel 10 and other conveniently arranged controls whereby the vehicle may be operated and steered. Arranged at the opposite side of the discharge end of the body is a conventional electric cable reel 11 on which a power conductor cable 12 is wound, and the tiltable end frame 8 carries suitable guides 13 for the cable, whereby the latter may be extended in various directions from the vehicle into connection with a suitable source of electric power such as a main power line. Arranged at one side of the opposite end of the body is an electric motor 14 which may be either of the A. C. or D. C. type. Arranged at the same side of the body, between the front and rear wheels, is a selective multi-speed automotive transmission 15. Located at the side of the body opposite from the motor 14 is a storage battery 16 and an electric control apparatus 17, while arranged between the front and rear wheels at this side of the body is a liquid tank 18 and a control valve apparatus 19, both associated with the selective multi-speed transmission 15 as later explained.

Now referring to the conveyor and wheel drives of the vehicle it will be noted that the motor 14 is connected through a coupling or clutch 21 to a universal shafting 22 extending longitudinally within the body at one side of the compartment and this shafting is, in turn, connected to the input shaft 23 of the selective transmission. The input shaft 23 extends toward the body material-receiving end portion 2a. The transmission 15 has in addition to the input shaft 23 another input shaft 53' which extends toward the body material-discharging end portion 2b in a direction opposite to the transmission input shaft 23 (Figs. 12 and 15). An output shaft 24 of the transmission is connected by universal shafting 25 to a shaft 26 (see Fig. 7) of a reduction gearing contained in a housing 27 suitably mounted on the adjacent side of the vehicle body. As illustrated, the shaft 26 is arranged coaxial with and is journaled centrally within a hollow shaft 28 which is suitably journaled within the gear housing 27. The hollow shaft 28 is connectible to the inner shaft 26 by a friction clutch 29 which includes an inner member 30 keyed to the inner shaft and an outer rotatable casing 31 secured to the outer hollow shaft. The member 30 and the casing 31 carry interleaved clutch discs or plates 32 which, when pressed together, serve frictionally to connect the shafts for rotation in unison. An annular piston 33 is received in a cylinder bore 34 formed within an end closure 35 of the rotatable casing, and this piston is secured to a clutch operating element 36, as illustrated. The clutch operating element is normally held retracted by coil springs 37 which act on bolts 38 passing through openings 39 in the casing and engaging the clutch operating element. The end closure 35 has an element 40 of a conventional fluid swivel 41 connected thereto, and an outer element 42 of the swivel is coupled to a fluid conduit 43. Thus, liquid under pressure may flow through the conduit 43 and through the swivel to the cylinder bore 34 to act on the piston 33 of the clutch operating element 36 to move the latter inwardly against the action of the springs 37 to effect loading of the clutch discs. When the cylinder bore is suitably vented the springs may retract the operating element 36 to release the clutch.

Secured to the outer shaft 28 is a spur gear 44 meshing with a spur gear 45 which in turn meshes with and drives a spur gear 46 secured to a parallel shaft 47 likewise suitably journaled in the housing 27. This shaft is connected by universal drive shafting 48 to a conventional speed reducer 49 which drives a cross shaft 50 suitably journaled within the tiltable end frame 8. Chain sprockets suitably secured to this cross shaft engage and drive the endless side chains 6 of the conveyor. The universal shafting 48 permits tilting of the end frame 8 of the vehicle, to adjust the discharge end of the conveyor, while maintaining the drive.

As shown in Figs. 12 and 15 the haulage vehicle may be easily modified from an electric motor driven vehicle to a combustion engine driven vehicle. This is due to the specific construction of the haulage vehicle body and the arrangement of the drive components thereon. To so modify the haulage vehicle the cable reel 11 and electric control apparatus 17 are removed from the body 1. An internal combustion engine indicated as 14' in Figs. 12 and 15 is placed in the space previously occupied by the cable reel 11. A fuel tank 17' operable to supply fuel to the internal combustion engine 14' is positioned in the space provided for the electric control apparatus 17. Conduits (not shown) interconnect the fuel tank 17' with the internal combustion engine 14'.

Universal shafting 51 connects the output shaft 53' with the internal combustion engine 14' so that the internal combustion engine 14' may drive the transmission 15. Universal shafting 22 between the electric motor 14 and the transmission input shaft 23 is disconnected. Thus by substituting an internal combustion engine 14' for the cable reel 11 and a fuel tank 17' for the electric control apparatus 17 the haulage vehicle can be changed from an electrically driven vehicle to a vehicle driven by an internal combustion engine.

Output shafts 52 and 53 are driven by the terminal element of the selective transmission 15 and are connected by oppositely extending universal drive shaftings 54 and 55 respectively, to gear housings 56 arranged at one side of the vehicle body, as shown in Fig. 3. These gear housings are suitably rigidly secured to the adjacent side of the vehicle body and each includes, as shown in Fig. 9, a drive shaft 57 having a beveled pinion 58 secured thereto and meshing with and driving a beveled gear 59, the latter, in turn, secured to a differential housing 60 having hub portions 61 suitably journaled within the gear housing. Beveled planet gears 62 of the differential are journaled on radial shafts 63 suitably supported within the differential housing and meshing with coaxial beveled gears 64 and 65 suitably journaled within the hub portions of the differential housing 60 (Fig. 9) These beveled gears 64 and 65 are keyed to the adjacent ends of aligned horizontal shafts 66 and 67 respectively, and the shaft 66 is suitably journaled within the gear housing 56 and has secured thereto a spur pinion 68 meshing with a spur gear 69 having its hub journaled within the gear housing 56 and keyed to a parallel shaft 70. The shaft 70 drives through a conventional universal joint structure 71, the hub 72 of the adjacent wheel. The wheel is mounted in a known manner on brackets 73 secured to the adjacent side of the vehicle body and these brackets provide an upright pivotal mounting, in alignment with the universal joint structure, whereby the wheel may be turned horizontally in the usual manner to effect steering. The steering gear connected to each traction wheel is conventional and is herein purposely omitted to facilitate illustration.

As shown in Fig. 10, the aligned cross shaft 67 extends transversely of the lower portion of the vehicle body beneath the bottom of the compartment and is arranged intermediate the upper and lower runs of the conveyor, and is suitably journaled in a gear housing 56' arranged at the opposite side of the body. The housing is similar to the housing 56 but, in this instance, the differential is omitted so that a pair of wheels is driven through a differential located at one side of the vehicle body. The shaft 67 is coupled at 74 to an aligned shaft 74' suitably journaled within the gear housing 56' (see Fig. 11), and secured to the shaft 74' is a spur pinion 68' meshing with a spur gear 69' likewise having its hub journaled within the gear housing 56' and similarly connected through a universal joint structure 71' to the adjacent traction wheel. The other pair of wheels is mounted and driven in an identical manner.

From the foregoing description, it will be evident that the pairs of front and rear wheels 3 and 4 may be concurrently driven and turned horizontally in unison about their swivel mountings, to effect propulsion and steering of the vehicle, and may be driven selectively at different predetermined speeds and in either direction at any speed through the selective transmission 15 while the electric motor 14 may run at a constant speed. Of course when an A. C. motor or a diesel engine is employed, a variable speed drive may also be effected by conventional appropriate control of the motor or engine as desired. It will be noted that the selective transmission 15 is arranged in a relatively low position on the vehicle body down between the front and rear wheels at one side of the body, in such manner as to provide direct drives with the wheels as well as to provide an extremely compact arrangement. The selective transmission 15 may include selective speed controlling clutches 75, 76 and 77 and forward and reverse clutches 78 and 79; each clutch having a hydraulic operator in the manner of the conveyor drive clutch above described in detail. Since this transmission may assume any appropriate form and does not per se enter into the present invention, further detail description thereof is herein considered unnecessary.

Driven by the motor 14 through the coupling or clutch 21 is a conventional fluid pump 80 and an electric generator 81, the latter being driven through a suitable belt and pulley connection 82 (see Fig. 8). This generator is connected by electric wiring 83 to the storage battery 16, as shown diagrammatically in Fig. 13 whereby charging of the battery may be effected. Also driven through an element of the selective transmission 15, through spur gearing 84 (Fig. 5) is a shaft 85 of a conventional fluid pump 86. The cable reel 11 is driven by an auxiliary hydraulic motor 87, and this motor may be operated in a known manner to drive the cable reel in a direction to wind in the power conductor cable 12 either when the vehicle is traveling or stationary, and may operate to cause the cable reel to rotate in unwinding direction with a predetermined resistance to rotation so as to maintain the conductor cable under the proper tension. The pump 80 is driven whenever the motor 14 (or internal combustion engine) is operating and the pump 86 is driven through the transmission only when the vehicle is traveling so that, in effect, this pump is driven by the traction wheels. The pump 80 has its suction side connected by a conduit 88 to the liquid tank 18, and the discharge side of the pump is connected by conduit 90 to the intake side of the reel motor 87. The discharge side of the reel motor is connected by a return conduit 91 back to the tank 18. A branch conduit 92 leads from the conduit 90, beyond a check valve 93, to a valve device 94, and a conduit 95 leads from this valve device back to the conduit 90, beyond a check valve 96. A relief valve 97, located in the conduit 90 between the check valves 93 and 96, is connected by a relief conduit 98 back to the return conduit 91. Thus, when the motor 14 is running the pump 80 may supply liquid under pressure through conduit 90 under the control of a reel drive regulating valve 99, to the reel motor 87. The pump 86 is reversible, depending upon the direction of travel of the vehicle, and has conduits 100 and 101 connected to its opposite sides and leading to conduits 102 and 102' respectively, the latter containing pairs of check valves 103, 104 and 105, 106. The conduits 102 and 102' are connected, beyond the check valves 105 and 106, to a pressure conduit 107 leading to the valve device 94, and conduits 102 and 102' are connected, beyond the check valves 103 and 104, to a return conduit 108 leading back to the tank 18.

Thus, from the foregoing it is evident that when the vehicle is traveling in either direction the pump 86 may supply liquid under pressure through the conduit 107 to the valve device 94 and thence to the reel motor 87 to drive the reel. When the vehicle is stationary the pump 80 may supply liquid under pressure to the reel motor 87 and to the other hydraulically operated elements of the vehicle including the clutch operating pistons. Thus, when the vehicle is stationary and the demands on the hydraulic system are relatively small, the pump 80 serves adequately to meet the demands, and when a large volume of hydraulic pressure is needed during traveling of the vehicle the pump 86, driven by the vehicle wheels, serves to supplement the liquid pressure supply. By such an arrangement the need for by-passing a large volume of liquid under pressure, with its inherent power losses, is avoided.

A branch conduit 110, containing a pressure reducing valve 111, leads from the conduit 90, between the check valve 93 and the relief valve 97, to valve devices 112, 113, 114 and 115, which are embodied in the control apparatus 19 and are operated by solenoids 116. The valve devices 113 and 112 are the forward and reverse control valves and are connected by conduits 117 and 118 respectively, to the forward and reverse clutches 78 and 79. The valve devices 114 and 115 control the selective operation of the speed controlling clutches 75, 76 and 77. The device 114 is connected by conduit 119 to the clutch 77 and the device 115 is connected by conduits 120 and 121 to the clutches 75 and 76 respectively. An operator controllable member 123, desirably a foot pedal located at the operator's station, is positionable to actuate switches 124 and 125 which control the energization of the solenoids 116 which in turn operate the valve devices 113 and 112 for the forward and reverse clutches, and a selector switch 126, having a shiftable operator 127, controls the energization of the solenoids 116 of the speed control valve devices 114 and 115. An electric line 131 leads from the positive side of the battery 16 to branch lines connected to the coils of the solenoids 116 of the valve devices 112, 113, 114 and 115, and lines 132 and 133 lead from the solenoids of the devices 112 and 113 to the forward and reverse switches 124 and 125. An electric line 134 leads from the negative side of the battery, and a line 135 connects the negative line 134 with the forward and reverse switches. The reversing switches are connected by lines 136 and 137 with the positive line 131, and lines 138 and 139 lead from the selector switch 126 to the solenoids 116 which operate the valve devices 114 and 115. Thus, when the forward drive switch 124 is closed the solenoid 116 is energized to actuate the valve device 113 controlling the clutch 78, and the selector switch 126 may then be positioned to effect energization of the desired one of the solenoids 116 selectively to operate the valve devices 114 and 115 which control the low, intermediate or high speed clutches. When reverse drive at any one of the three speeds indicated is desired the reverse control switch 125 may be closed thereby to energize the solenoid which controls the valve device 112 thereby to apply the reverse drive clutch 79, while the forward drive clutch 78 is released due to the opening of the switch 124.

Now referring to the electrical control system for the electric driving motor 14, it will be observed that a line 143 (Fig. 13) is connected to the electric line leading to the positive side of the battery and this line leads to the selector switch 126, and connected in this line are start and stop switches 144 and 145, a time relay 146 and a switch 147. A parallel line 148 leads from the line 143 between the starting switch 144 and the time relay 146 and is connected to the electric line 134 leading to the negative side of the battery, and this line 148 has connected therein a switch 149. A branch parallel line 150 leads from the line 148, between the starting switch and the switch 149, and is connected to the line 134 leading to the negative side of the battery, and this line 150 has connected therein a time relay 151 and forward and reverse relays 152 and 153, the latter associated with forward and reverse switches 154 and 155. Associated with the cable reel 11 are positive and negative lines 156 and 157 (Fig. 14) of the circuit for the motor 14, which have connected therein switches 158 and 159. The series field of the motor is designated 160, the shunt field is designated 161, and a starting resistance is designated 162. An accelerator switch 163 serves to cut in or out the starting resistance for the motor. When the vehicle is stationary and it is desired to start the motor 14 the operator closes the starting switch 144, causing the switch 149 to be closed thereby to effect closure of the switches 158 and 159 of the motor circuit. Upon closure of the time relay 146 the switch 147 is actuated to effect closure of the accelerator switch 163 and cutting in the starting resistance 162 of the motor, and as a result, the motor is started. After the motor has started to run the resistance 162 is automatically cut out. If desired to effect propulsion of the vehicle the operator may close the desired one of the switches 124, 125, thereby energizing the solenoid of one of the valve devices 112, 113 thereby to cause loading of the desired forward or reverse clutch 78, 79. Conduits 164 and 165 lead from the conduits 117 and 118 controlled by the valve devices 113 and 112 respectively, to cylinders 166 containing reciprocable pistons 167, so that when the desired clutch 78, 79 is loaded by liquid under pressure liquid may flow through one or the other conduits 164, 165 to cause actuation of the proper one of the pistons 167 to close the proper switch 154, 155.

In this improved electrical system when either the forward or the reverse clutch 78 or 79 is closed to effect propulsion of the vehicle in the desired direction, liquid under pressure flows through the proper one of the conduits 164 and 165 to the proper one of the cylinders 166 to effect actuation of the piston which closes the desired switch, and during shifting forward to reverse and vice versa the time relays 151 and 146 cause current flow to the switch 147, thus to effect actuation of the switch 163 to cut in the starting resistance 162. Thus, by cutting in the resistance 162 during shifting from one direction or the other, peak loads on the system are substantially eliminated.

As shown in Fig. 13 a conduit 169 leads from the conduit 110 to a manual control valve device 170, and the conduit 43 of the hydraulically operated conveyor clutch 29 is connected to this valve device so that the conveyor may be started or stopped under the control of the operator.

As a result of this invention an improved mine haulage vehicle is provided which may be propelled and controlled in an improved manner. By the provision of the single prime mover and the selective multi-speed transmission, by which the traction wheels, the conveyor and the pressure generating means are driven, a vehicle which is extremely compact and simple in construction is made possible. The novel controls for the transmission together with the improved hydraulic and electrical systems and the improved motor controlling means, efficiency in operation and ease of control are attained. By the provision of the hydraulic system embodying the two relatively small pumps, power losses are substantially reduced and simplification and greater compactness are made possible. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A haulage vehicle comprising a mobile body having a material-receiving compartment extending lengthwise thereof, an endless conveyor extending longitudinally of said body along the bottom of said compartment and having upper and lower runs, pairs of front and rear supporting and propelling wheels for said body at the sides thereof, a prime mover arranged at one side of said body, and driving connections between said prime mover and all of said wheels including a differential gearing for each pair of wheels said gearings arranged at one side of said body, and shafting driven through said differential gearings and extending transversely of the lower portion of said body between said upper and lower runs of said conveyor for driving said wheels at the other side of said body.

2. In a haulage vehicle, a mobile body having a material-receiving compartment extending lengthwise thereof and a conveyor extending along the bottom of said compartment, a prime mover arranged on said body at one side of said compartment, a selective multi-speed transmission on said body at the same side of said compartment and driven by said prime mover, supporting and propelling means for said body, driving connections between said transmission mechanism and said supporting and propelling means for propelling the vehicle selectively at different speeds, and driving connections between said transmission and said conveyor at the same side of said compartment.

3. In a haulage vehicle, a mobile body having a material-receiving compartment extending lengthwise thereof and a conveyor extending along the bottom of said compartment, a prime mover arranged on said body at one side of said compartment, a selective multi-speed transmission on said body at the same side of said compartment and driven by said prime mover, supporting and propelling means for said body, driving connections between said transmission mechanism and said supporting and propelling means for propelling the vehicle selectively at different speeds, and driving connections between said transmission and said conveyor at the same side of said compartment and including speed reducing gearing also arranged at the same side of said compartment.

4. In a haulage vehicle, a mobile body having a material-receiving compartment extending lengthwise thereof and a conveyor extending along the bottom of said compartment, pairs of front and rear supporting and propelling wheels for said body, a prime mover arranged on said body at one side of said compartment, a selective multi-speed transmission on said body at said side of said compartment intermediate a front and a rear wheel at the adjacent side of the body, said transmission being driven by said prime mover, driving connections between said transmission and all of said wheels including shafting extending longitudinally in opposite directions from said transmission at said side of said compartment to effect drive of said wheels by said prime mover through said transmission, and driving connections between elements of said transmission and said conveyor including shafting extending longitudinally at said same side of said compartment.

5. A haulage vehicle as set forth in claim 4 wherein the driving connections between said transmission and said wheels also includes cross shaftings extending beneath the compartment bottom and operatively connected to the front and rear wheels at the opposite side of said body.

6. In a haulage vehicle, a mobile body having a material-receiving compartment extending lengthwise thereof, an endless conveyor extending longitudinally of said body along the bottom of said compartment and having upper and lower runs, pairs of front and rear supporting and propelling wheels for said body at the sides thereof, a prime mover, driving connections between said prime mover and all of said wheels for propelling the vehicle including a selective multi-speed transmission and differential gearing for each pair of wheels arranged on the same side of said body and shafting driven through said differential gearings and extending transversely of the lower portion of said body between said upper and lower runs of said conveyor for driving said wheels at the other side of said body, and driving connections between said transmission and said conveyor at the same side of said compartment and including speed reducing gearing also arranged at the same side of said compartment.

7. A vehicle comprising a mobile body having a material-receiving compartment extending lengthwise thereof centrally between its sides, a conveyor extending along the bottom of said compartment, pairs of front and rear supporting and propelling wheels for said body, the bottom of said compartment being located below the horizontal plane of the wheel axes, a prime mover arranged at one side of said body, driving connections between said prime mover and all of said wheels including a differential gearing for each pair of said wheels, said gearing arranged on said body at said side of said compartment and operatively connected to the adjacent side wheels, driving connections between said differential gearing and said wheels at the other side of said compartment including cross shafting extending beneath the compartment bottom for driving said last named wheels.

8. A vehicle as set forth in claim 7 wherein said differential gearings are arranged coaxial with said cross shaftings respectively with a major portion of said gearings located below the horizontal plane of the compartment bottom.

9. A vehicle as set forth in claim 7 wherein a multi-speed selective transmission is arranged on said body at said one side of said compartment intermediate the front and rear wheels and is driven by said prime mover, and driving connections are provided between said transmission and said differential gearing to effect drive of said wheels selectively at different speeds through said transmission.

10. A vehicle as set forth in claim 9 wherein driving connections are provided between elements of said transmission and said conveyor.

11. A vehicle as set forth in claim 10 wherein the driving connection between said transmission and said conveyor includes speed reducing gearing also arranged at the same side of said compartment.

12. A vehicle as set forth in claim 11 wherein the driving connection between elements of said transmission and said conveyor include shafting extending longitudinally at the same side of said compartment.

13. In a haulage vehicle a mobile body having a material-receiving compartment extending lengthwise thereof with a material-receiving end portion and a material-discharging end portion, a conveyor extending along the bottom of said compartment, a selective multi-speed transmission arranged on said body at one side of said compartment, said transmission having a pair of power input shafts extending therefrom, one of said power input shafts extending toward said mobile body material-receiving end portion and the other of said shafts extending toward said mobile body material-discharging end portion, an internal combustion engine arranged at said side of said compartment adjacent said material-discharging end portion, driving connections between said last named transmission input shaft and said internal combustion engine to drive said transmission, supporting and propelling means for said body, driving connections between said transmission mechanism and said supporting and propelling means for propelling said vehicle selectively at different speeds, and driving connections between said transmission and said conveyor at the same side of said compartment.

14. In a haulage vehicle a mobile body having a material-receiving compartment extending lengthwise thereof with a material-receiving end portion and a material-discharging end portion, a conveyor extending along the bottom of said compartment, a selective multi-speed transmission arranged on said body at one side of said compartment, said transmission having a pair of power input shafts extending therefrom, one of said power input shafts extending toward said mobile body material-receiving end portion and the other of said shafts extending toward said mobile body material-discharging end portion, an electric motor arranged on said body at the same side of said compartment adjacent said material-receiving end portion, an electric cable reel rotatably mounted on said body at the same side of said compartment adjacent said material-discharging end portion, said electric cable reel having a power conductor cable wound thereon for supplying electric power to said motor, driving connections between said first named transmission input shaft and said electric motor to drive said transmission, supporting and propelling means for said body, driving connections between said transmission mechanism and said supporting and propelling means for propelling said vehicle selectively at different speeds, and driving connections between said transmission and said conveyor at the same side of said compartment.

15. In a haulage vehicle, a mobile body having a material-receiving compartment extending lengthwise thereof and a conveyor extending along the bottom of said compartment, supporting and propelling means for said body, an electric motor arranged on said body at one side of said compartment for driving said supporting and propelling means, an electric cable reel rotatably mounted on said body and having a power conductor cable wound thereon for supplying electric power to said motor, a selective multi-speed transmission on said body at the same side of said compartment and driven by said electric motor, driving connections between said transmission and said supporting and propelling means for propelling the vehicle selectively at different speeds, driving connections between said transmission and said conveyor at the same side of said compartment, and means driven by said transmission for rotating said reel only when said vehicle is traveling.

16. A vehicle comprising a mobile body having a material-receiving compartment extending lengthwise thereof, an endless conveyor extending longitudinally of said body along the bottom of said compartment and having upper and lower runs, pairs of front and rear supporting and propelling wheels for said body at the sides thereof, an electric motor arranged at one side of said body for driving said wheels, an electric cable reel rotatably mounted on said body at said side and having a power conductor cable wound thereon for supplying electric power to said motor, and driving connections between said electric motor and all of said wheels including a differential gearing for each pair of wheels, said gearing arranged at one side of said body, shafting driven through said differential gearing and extending transversely of the lower portion of said body between said upper and lower runs of said conveyor for driving said wheels at the other side of said body, and means actuated by said driving connections to rotate said reel only when said vehicle is traveling.

17. A vehicle comprising a mobile body having a material-receiving compartment extending lengthwise thereof, a conveyor extending along the bottom of said compartment, pairs of front and rear supporting and propelling wheels for said body, a prime mover on said body at one side of said compartment, a selective multi-speed transmission on said body at said side of said compartment intermediate the front and rear wheels at the adjacent side of the body, said transmission being driven by said prime mover, driving connections between said transmission and all of said wheels including shafting extending longitudinally in opposite directions from said transmission at said side of said compartment, and a driving connection between said prime mover and said transmission including shafting extending longitudinally at said side of said compartment, said last mentioned shafting extending longitudinally past the connection of said first mentioned shafting with one pair of said wheels with the latter pair of wheels spaced longitudinally of the vehicle intermediate said prime mover and said transmission, and driving connections between said transmission and said conveyor at the same side of said compartment.

18. A vehicle as set forth in claim 17 wherein said driving connections between said transmission and said wheels includes cross shaftings driven from said first mentioned longitudinal shaftings and operatively connected to the front and rear wheels at the opposite side of said body.

19. A vehicle comprising a mobile body having a material-receiving compartment extending lengthwise thereof and a conveyor extending along the bottom of said compartment, pairs of front and rear traction wheels for said body, a prime mover carried by said body near one end and at one side thereof, a selective multi-speed transmission arranged on said body at said side thereof and located down between the adjacent front and rear wheels, said transmission having input and output shafts, a driving connection between said prime mover and the input shaft of said transmission, oppositely extending shafting driven by the output shafts of said transmission, gearings arranged at said side of said body and driven by said shafting, connections between said gearings and said wheels including shafts extending transversely across the lower portion of said body for connecting said gearings to the wheels at the opposite side of said body and driving connections between said transmission and said conveyor at the same side of said compartment.

(References on following page)

References Cited in the file of this patent

UNITED STATES PATENTS

| | | |
|---|---|---|
| 462,369 | Blackwell | Nov. 3, 1891 |
| 1,329,914 | McKenna | Feb. 3, 1920 |
| 1,661,780 | Warhus | Mar. 6, 1928 |
| 2,132,450 | Wolf | Oct. 11, 1938 |
| 2,215,314 | Austin | Sept. 17, 1940 |
| 2,238,615 | Wolf | Apr. 15, 1941 |
| 2,264,235 | Blagden et al | Nov. 25, 1941 |
| 2,266,770 | Kurtz et al. | Dec. 23, 1941 |
| 2,308,351 | Blagden et al. | Jan. 12, 1943 |
| 2,317,623 | Lee | Apr. 27, 1943 |
| 2,357,742 | Jeffrey | Sept. 5, 1944 |
| 2,384,182 | Lewis | Sept. 4, 1945 |
| 2,395,302 | Slomer | Feb. 19, 1946 |
| 2,399,619 | Beck | May 7, 1946 |
| 2,457,569 | Lee | Dec. 28, 1948 |
| 2,555,242 | Nenninger et al. | May 29, 1951 |
| 2,557,896 | Soule et al. | June 19, 1951 |
| 2,588,341 | Beck | Mar. 11, 1952 |
| 2,589,235 | Dudley | Mar. 18, 1952 |
| 2,601,297 | Keese | June 24, 1952 |
| 2,602,518 | Beck | July 8, 1952 |